United States Patent [19]
McFarland

[11] Patent Number: 5,392,871
[45] Date of Patent: Feb. 28, 1995

[54] AMPHIBIOUS VEHICLE AND CONTROL

[76] Inventor: Douglas McFarland, R.R. 1, Box 83, Lamoni, Iowa 50140

[21] Appl. No.: 108,902

[22] Filed: Aug. 18, 1993

[51] Int. Cl.⁶ ............................................. B62D 11/04
[52] U.S. Cl. .......................... 180/6.48; 74/471 XY; 180/7.2; 114/144 R; 114/270; 440/5; 440/48
[58] Field of Search ................. 440/5, 48; 114/144 R, 114/270, 150; 180/7.2, 6.48, 308; 74/471 XY

[56] References Cited

U.S. PATENT DOCUMENTS

| | | | |
|---|---|---|---|
| 559,912 | 5/1896 | Stauber | 440/48 |
| 941,923 | 11/1909 | Hoffman | 440/48 |
| 1,321,304 | 11/1919 | Hamilton | 440/48 |
| 2,376,647 | 5/1945 | Akins | 114/270 |
| 3,030,908 | 4/1962 | Charles | 114/270 |
| 3,229,658 | 1/1966 | Schrader | 114/270 |
| 3,422,790 | 1/1969 | Connell | 440/4 |
| 3,891,042 | 6/1975 | Braun | 180/6.48 |
| 4,358,280 | 11/1982 | Jeanson et al. | 440/61 |
| 4,476,948 | 10/1984 | Komoto et al. | 114/270 |
| 4,867,716 | 9/1989 | McFarland | 440/48 |
| 5,131,483 | 7/1992 | Parkes | 180/6.48 |
| 5,203,274 | 4/1993 | Hart | 440/48 X |

FOREIGN PATENT DOCUMENTS 2941246  4/1981  Germany .

*Primary Examiner*—Sherman Basinger
*Attorney, Agent, or Firm*—Brian J. Laurenzo; Kent A. Herink; Brett J. Trout

[57] ABSTRACT

An amphibious vehicle having a hull and pair of multiple-flighted outriggers which coact to stabilize and propel the vehicle over land and water. The speed and direction of the vehicle is controlled by a joystick allowing an operator to move the craft over land and water with a single hand. The multiple flighting and positioning of the outriggers adds efficiency and stability to the vehicle while the joystick control adds ease of operation.

3 Claims, 6 Drawing Sheets

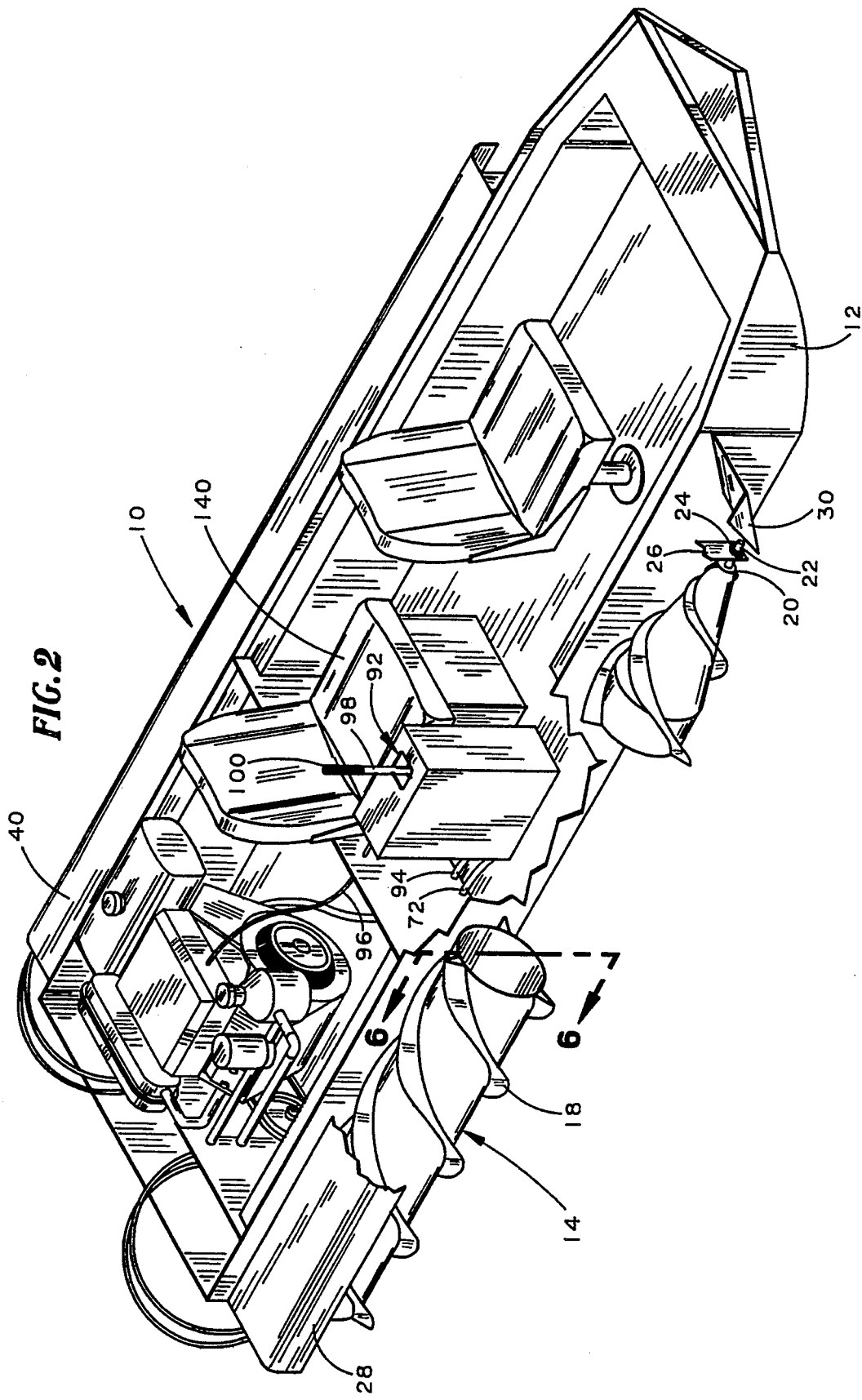

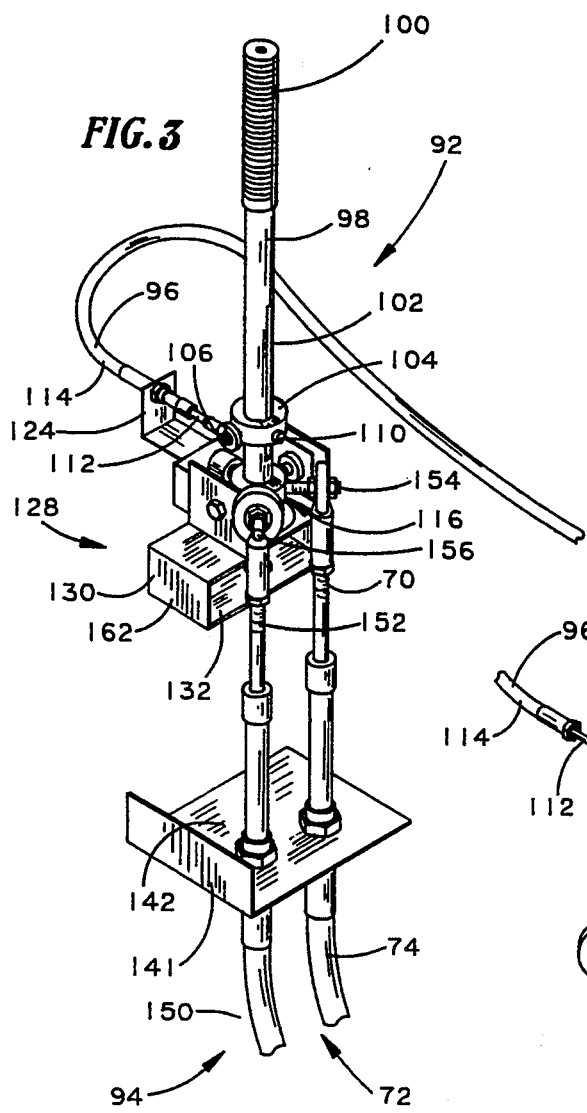
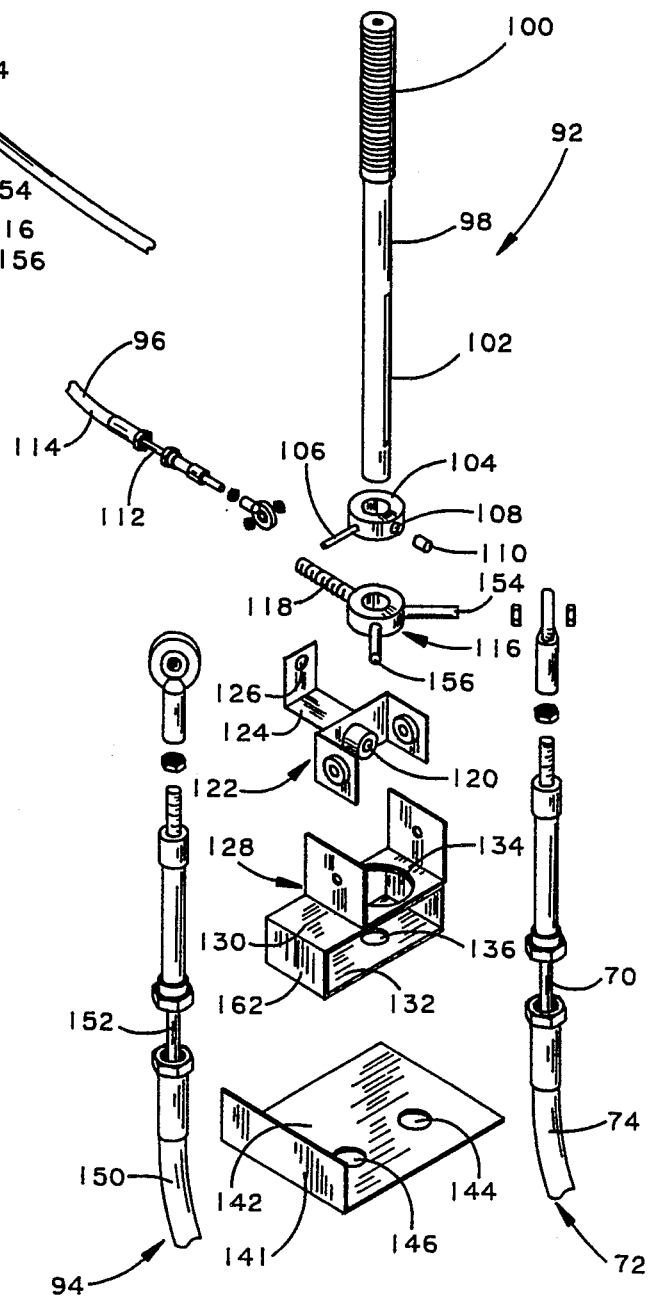
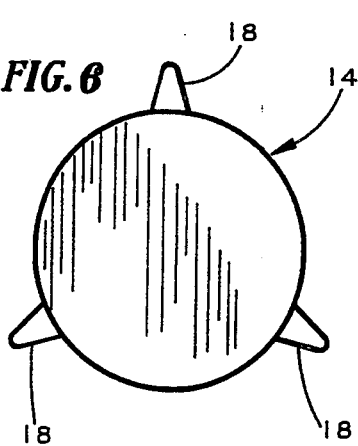

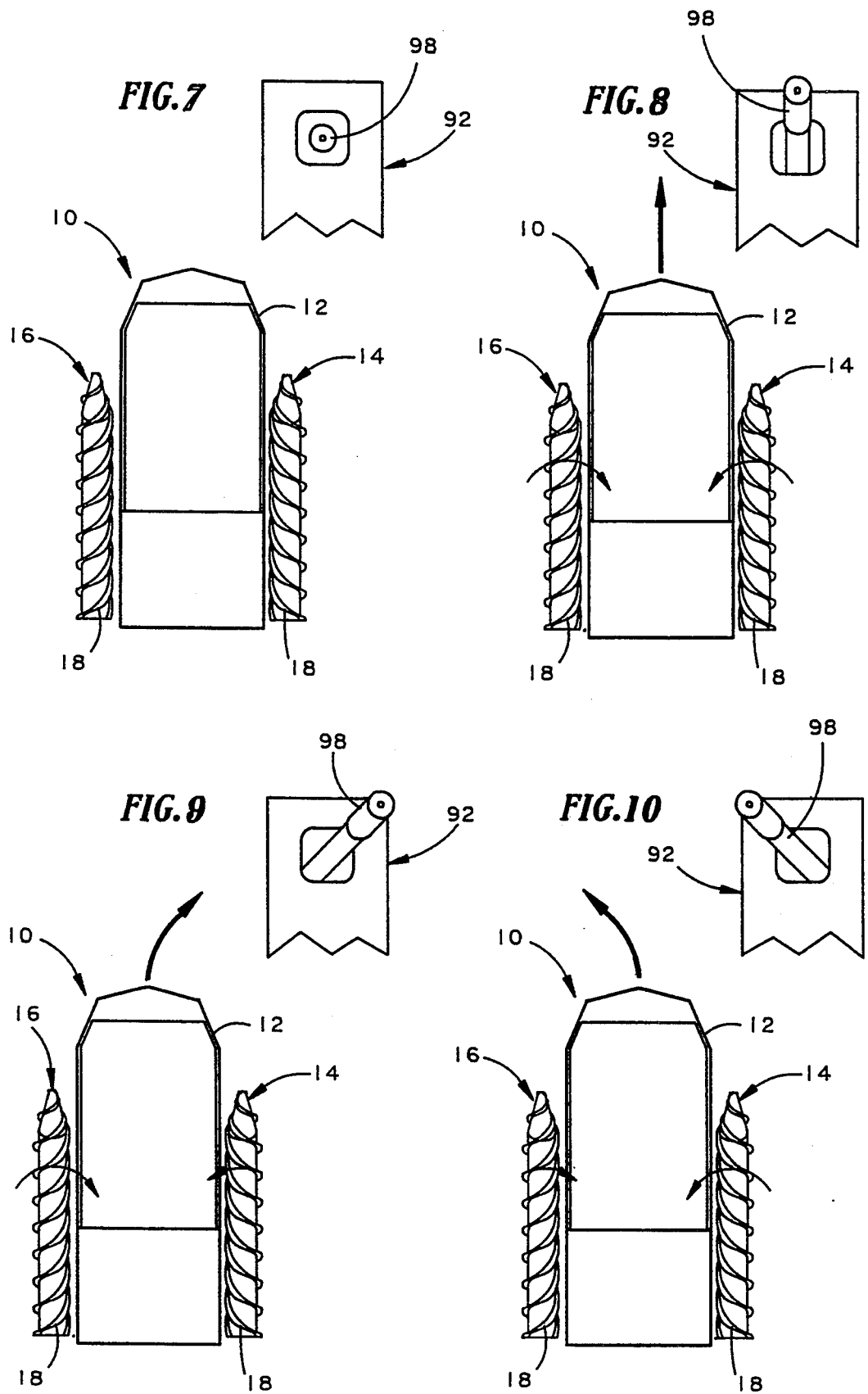

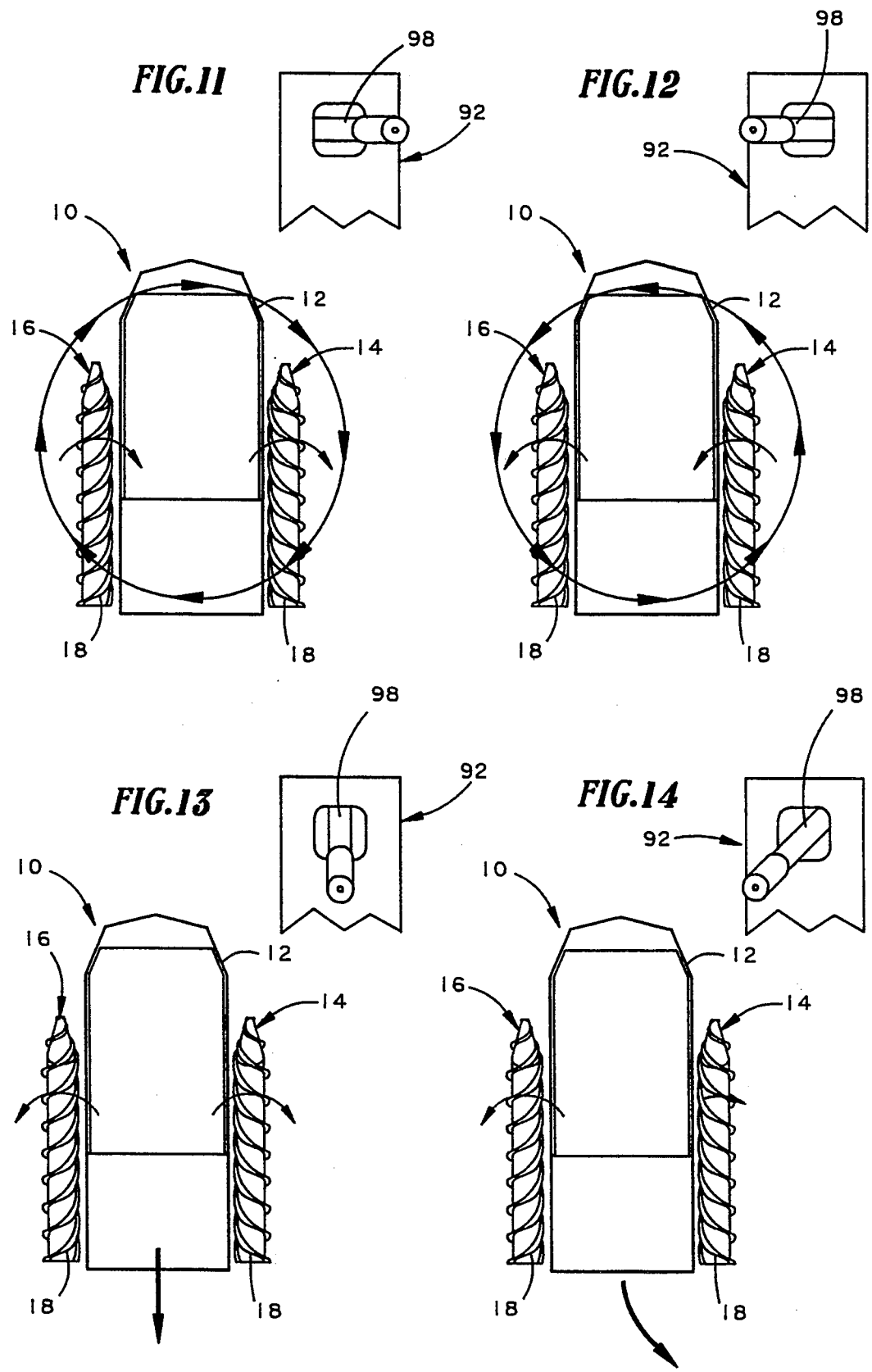

AMPHIBIOUS VEHICLE AND CONTROL

BACKGROUND OF THE INVENTION

The present invention relates generally to an amphibious vehicle and, more particularly, to an amphibious vehicle having a pair of reversely flighted outriggers operably connected to either side of a buoyant hull to propel the vehicle over both water and land.

It is well know in the prior art such as U.S. Pat. Nos. 4,476,948 and 5,203,274 to propel an amphibious vehicle with a pair of single-flighted parallel augers. These and other prior art amphibious vehicles employing single-flight auger-type propulsion have the disadvantage of poor maneuverability and propulsion in water making them impracticable for long distances or narrow straits.

A major drawback of these prior art devices is the inefficiency with which rotational movement of the augers is transferred into propulsive movement. The lead on the flights is typically too long to give adequate pulling power or too short to give adequate speed.

Another drawback of these prior art amphibious vehicles is the relative instability of the vehicles. The typical prior art amphibious vehicles employ only the two augers for flotation or, alternatively, attach the augers within recesses of the hull, thereby providing very little lateral stability against capsizing under turbulent conditions. Yet another drawback of the prior art devices is the complexity with which a dual auger amphibious craft must be operated. The independent operation of the augers required to accomplish tight turns and land travel typically require separate controls for each auger thereby making the vehicle difficult to control for the novice.

The difficulties encountered in the prior art discussed herein above are substantially eliminated by the present invention.

SUMMARY OF THE INVENTION

Accordingly, it is an object of the present invention to provide an amphibious vehicle with increased maneuverability for navigating various obstacles.

A further object of the present invention is to provide an amphibious vehicle with increased stability to resist capsizing under turbulent conditions.

Another object of the present invention is to provide an amphibious vehicle with increased propulsion efficiency.

Yet another object of the present invention is to provide an amphibious vehicle having increased pulling power for pulling various objects either on land or through the water.

One other object of the present invention is to provide an amphibious vehicle with increased speed.

Still another object of the present invention is to provide an amphibious vehicle which is easy to maneuver and operate.

These and other objects of the present invention will become apparent upon reference to the following specifications, drawings, and claims.

By the present invention, it is proposed to overcome the difficulties encountered heretofore. To this end, an amphibious vehicle is provided having a buoyant hull with at least two sides. Operably connected to each side of the hull is a substantially cylindrical buoyant outrigger. Each outrigger is provided with at least two sets of flights and, preferably, three sets of flights. The outriggers are reversely flighted from one another to prevent side drafting of the vehicle in either forward or reverse operation.

Preferably, the outriggers are propelled by hydraulic motors connected to a joystick controller. The Joystick is provided with a controller operably connected to means for operating both outriggers. The controller is pivotally connected to a fulcrum and rotatively connected to a throttle mechanism to allow simultaneous and independent control of both outriggers.

BRIEF DESCRIPTION OF THE DRAWINGS

In the drawings:

FIG. 2 is the amphibious vehicle of FIG. 1 shown in partial cross-section;

FIG. 3 is an enlarged perspective view of the joystick showing the controller connected to the throttle control and the starboard and port hydraulic controls;

FIG. 4 is an exploded view of the joystick shown in FIG. 3;

FIG. 6 is a cross-sectional view taken along lines 6—6 of FIG. 2;

FIG. 7 is a top plan view of the joystick and outriggers in the neutral position;

FIG. 8 is a top plan view of the amphibious vehicle showing the motion of the vehicle and the direction of rotation of the outriggers when the joystick is placed fore;

FIG. 9 is a top plan view vehicle showing the motion of the vehicle and the direction of rotation of the outriggers when the joystick is placed fore and starboard;

FIG. 10 is a top plan view showing the motion of the vehicle and the outriggers when the joystick is placed fore and port;

FIG. 11 is a top plan view showing the motion of the vehicle and the outriggers when the joystick is placed starboard;

FIG. 12 is a top plan view showing the motion of the vehicle and the outriggers when the joystick is placed port;

FIG. 13 is a top plan view showing the motion of the vehicle and the outriggers when the joystick is placed aft;

FIG. 14 is a top plan view showing the motion of the vehicle and the outriggers when the joystick is placed aft and port;

DETAILED DESCRIPTION OF THE INVENTION

Figure 1:
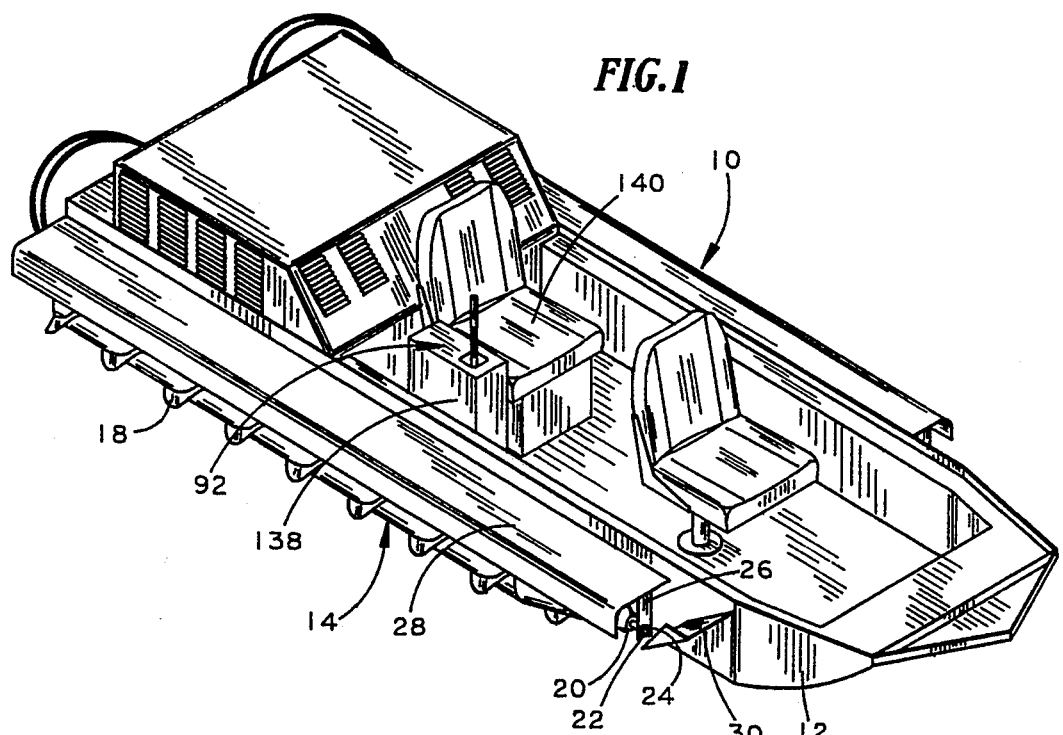
FIG. 1 is perspective view of the amphibious vehicle showing the starboard outrigger and the joystick.

In the figures, an amphibious vehicle for moving across land or water is shown generally at 10 (FIG. 1). The vehicle consists of a buoyant hull 12 and a pair of outriggers 14 and 16 (FIG. 7). The hull 12 is preferably of a fiberglass or similar material formed with a buoyant material to prevent the hull 12 from sinking in the event the vehicle 10 becomes capsized or filled with water.

The outriggers are 12-foot long aluminum cylinders of approximately 15 inches in diameter. The aluminum used to form the cylinders may be relatively thin and a thickness of 105/1000 of an inch works well given the rigidity added to the outriggers 14 and 16 by the flights 18 secured to the outriggers 14 and 16. Because the outriggers 14 and 16 are positioned laterally in relationship to the hull 12, the outriggers 14 and 16 coact to prevent the vehicle 10 from capsizing. The forward end of the outriggers 14 and 16 are preferably tapered in a frusto conicle configuration which allows an endcap 20 to be secured to the outrigger 14 by weldments or similar securement means (FIG. 1). An axle 22 is secured through the endcap 20 to the outrigger 14 by weldments or similar securement means.

The axle 22 is journaled through a bushing 24 connected to a support plate 26 which is secured to the buoyant hull 12. In a preferred embodiment in the present invention, a fender 28 is secured to the buoyant hull 12 over the outrigger 14 along the length of the outrigger 14 to prevent water from splashing up over the buoyant hull 12 and onto passengers in the vehicle 10. In the preferred embodiment of the present invention, the support plate 26 is welded to the fenders 28 to increase the stability of the connection between the outriggers 14 and 16 and the buoyant hull 12.

In front of the support plate 26 is a deflection plate 30, preferably constructed of steel and securely mounted to the hull 12 at a 45 degree angle, with the top portion of the plate 30 level with the upper most portion of the hull 12 and the lower portion of the plate 30 positioned below the axle 22. The deflection plate 30 prevents the outrigger 14 from passing under, rather than over, debris such as logs and ice which may come in contact with the vehicle 10.

Figure 5:
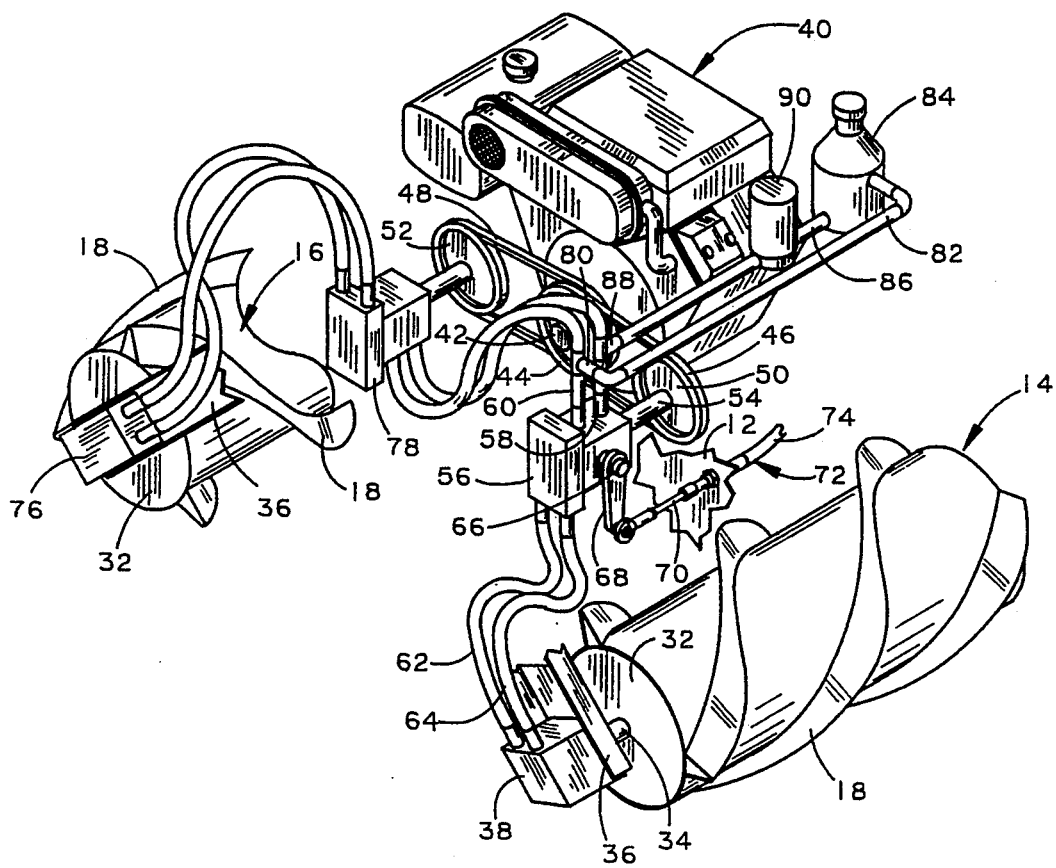
FIG. 5 is a perspective view of the engine used to drive the hydraulic motors shown connected to a pair of sheaves used to drive the outriggers.

The rear of the outriggers 14 and 16 are provided with endplates 32 which are welded to the outriggers 14 and 16 and through which pass rear axles 34 which are welded to the endplates 32 (FIG. 5). If more stability is required, the axles 32 and 34 may be extended further into the outriggers 14 and 16 and secured to optional ribs (not shown) located within the outriggers 14 and 16. The rear axles 34 extend from the endplates 32 through motor brackets 36 and are drivably connected to a pair of hydraulic motors 38 and 76. The motor brackets 36 are secured to the hull 12 to stabilize the outriggers 14 and 16 and support the hydraulic motors (FIGS. 1 and 5).

The interiors of the outriggers 14 and 16 may either be hollow or, preferably, filled with a buoyant material such as styrofoam (not shown) so that, even if one of the outriggers 14 or 16 were punctured, the outriggers 14 and 16 would remain afloat. Alternatively, the outriggers 14 and 16 may be baffled with ribs of aluminum (not shown) so that, if a puncture occurs in one of the outriggers 14 or 16, only a portion of the outrigger 14 or 16 will be exposed to water, thereby maintaining the integrity of the outrigger 14 or 16 and allowing the vehicle 10 to remain afloat.

The flights 18 are preferably constructed of aluminum and welded to the outriggers 14 and 16. As shown in FIG. 6, the flights 18 are constructed of aluminum strips which are folded over and welded to the outriggers 14 and 16 (FIGS. 5 and 6). Although the flights 18 need not be folded over, such a construction increases the strength of the flights and prevents the flights 18 from being damaged during land travel.

A particular advantage of the present invention over prior art devices is the incorporation of a plurality of flights on a single outrigger 14 (FIG. 6). In the preferred embodiment of the present invention, three flights are provided on each outrigger 14 and 16 to provide increased propulsion and performance in the water due to the greater amount of flighting contacting the water at any given time. The increased amount of flighting contacting the water also increases the pulling power of the vehicle 10 compared to both propeller driven and prior art auger driven craft. Preferably, the flights 18 are secured to the outrigger 14 along the entire length of the outrigger 14 with a four-foot lead so that the flights 18 make a complete revolution of the outrigger 14 along every four longitudinal feet of the outrigger 14 (FIG. 2). Although three flights 18 are shown for each outrigger 14 and 16, more flights may be added for larger diameter outriggers or if the flights are shorter (FIGS. 5 and 6).

Preferably, the starboard outrigger 14 is reversely flighted from the port outrigger 16 so that, as the vehicle 10 moves either forward or backward, side-drafting is eliminated (FIG. 7). Also preferably, the starboard outrigger 14 is provided with left-handed flighting while the port outrigger 16 is provided with right-handed flighting to facilitate control of the vehicle 10 with a single joystick 92. The fenders 28 are secured to the hull 12 extending outward and downward around the outriggers 14 and 16 so that water driven by the outriggers 14 and 16 is not carried over the hull 12 during operation of the vehicle 10 (FIG. 1).

The vehicle is powered by a standard combustion engine 40 connected by a drive axle 42 to a dual groove pulley 44 (FIG. 5). The pulley 44 is connected by a pair of belts 46 and 48 to a pair of sheaves 50 and 52. As the action of the starboard and port hydraulic systems are essentially mirror images of one another, description will be made only to the starboard side of the drive apparatus. The sheave 50 is connected by means of an axle 54 to a hydraulic pump 56.

The pump 56 is preferably connected to four hoses: a supply hose 58, a return lose 60, and two drive hoses 62 and 64. Inside the pump 56 is a standard three-way transmission (not shown) which moves the pump 56 from neutral into either forward or reverse, thereby sending fluid either through the forward drive hose 62 or the reverse drive hose 64 or neither hose. The transmission is operated by a transmission shaft 66 connected to a lever arm 68. The lever arm 68 is connected to the inner cable 70 of a standard push-pull cable 72 by a rivet or similar connection means. The outer sheath 74 of the push-pull cable 72 is secured to the hull 12 so that the inner cable 70 may be moved in relationship to the outer sheath 74.

The forward drive hose 62 extends from the pump 56 to the hydraulic motor 38 while the reverse drive hose 64 extends from the hydraulic motor 38 back to the pump 56. Both the supply and return hoses 58 and 60 are connected between the starboard pump 56 and the port pump 78. A T-connector 80 joins the return hose 60 to a overflow hose 82 which empties into a supply tank 84. The supply tank 84 is connected to a refill hose 86 which allows fluid to flow into the supply hose 58 through a second T-connector 88. A filter 90 is mounted on the refill hose 86 to prevent contaminants from returning to the system.

Control of the vehicle 10 is obtained through use of a joystick 92 (FIG. 2). The joystick 92 is connected to the starboard push-pull cable 72 and a port push-pull cable 94 which are connected to the starboard and port pumps 56 and 78 (FIGS. 2 and 5). The joystick 92 is also preferably connected to a throttle push-pull cable 96 to allow the joystick 92 to control the speed of the vehicle 10 as well as the direction. The joystick consists of a steel shaft controller 98 fitted with a handgrip 100 and a flute 102 running along the side of the controller 98 (FIG. 3). A throttle ring 104 constructed of an annular piece of steel is fitted with a protruding throttle pin 106 which is simply a steel pin welded or otherwise secured to the circumference of the ring 104. The ring 104 has a threaded hole 108 passing from the exterior circumference of the ring 104 to the interior circumference (FIG. 4). A set screw 110 is provided and screwed into the hole 108 once the ring 104 has been placed over the controller 98. The set screw 110 is screwed into the hole 108 a sufficient distance to allow the screw 110 to extent beyond the inner circumference of the ring 104 and into the flute 102 provided in the controller 98. The set screw 110 thereby allows upward and downward movement of the controller 98 without disturbance of the throttle ring 104, yet prevents twisting of the controller 98 without similar movement of the throttle ring 104.

The throttle push-pull cable 96 has an inner cable 112 and an outer sheath 114 with the inner cable 112 connected to the throttle pin 106 by means of a rivet or similar connection means and the outer sheath 114 connected to a throttle support 124 to allow the inner cable 112 to move within the outer sheath 114. The throttle push-pull cable 96 is also connected to the combustion engine 40 in such a manner that movement of the inner cable 112 in relationship to the outer sheath 114 alternatively increases and decreases the speed of the combustion engine 40 (FIGS. 2 and 3).

A Y-ring 116 is provided having a construction similar to that of the throttle ring 104 except that three pins rather than one extend from the Y-ring 116, and the threaded hole is absent (FIG. 4). Preferably, a forward pin 118 is threaded so that it may be screwed into a threaded hole 120 located on a pivoting bracket 122. The throttle support 124 extends from the bracket 122. The throttle support 124 is a generally L-shaped piece of steel welded to the pivoting bracket 122 and provided with a hole 126 so that the inner cable 112 may pass through the hole 126, and the outer sheath 114 may be secured to the throttle support 124 (FIGS. 3 and 4). The inner cable 112 is secured to the throttle connector 106 so that, as the controller 98 is rotated, the inner cable 112 extends and retracts within the outer sheath. 114.

The pivoting bracket 122 is pivotally connected to a brace 128 having an upper support 130 and a lower support 132. The upper support 130 is provided with a large circular aperture 134 to allow the controller 98 a full range of motion within the aperture 134. The lower support 132 is provided with a smaller aperture 136 which is large enough to allow the controller 98 to be inserted through the aperature 136 yet small enough to prevent free movement of the controller 98 when the controller 98 is placed within the aperature 136. When the controller 98 is placed within the aperature 136, the pivoting bracket 122 and lower aperture 136 coact to prevent accidental movement of the controller 98.

The side 162 of the brace 128 is connected to a throttle housing 138 preferably positioned next to a captain's chair 140 (FIG. 2). Secured to the lower portion of the throttle housing 138 is a side 141 of a cable bracket 142. The cable bracket 142 is provided with two apertures 144 and 146 through which are placed the starboard push-pull cable 72 and the port push-pull cable 94 connected to the pumps 56 and 78 (FIGS. 2, 4 and 5). The cables 72 and 94 are secured to the bracket 142 so that outer sheaths of the cables 74 and 150 remain stationary with respect to the bracket 142 while the inner cables 70 and 152 are free to move in relationship to the bracket 142 (FIG. 4). The inner cables 70 and 152 are connected to a pair of direction pins 154 and 156 so that as the controller 98 is manipulated the cables 70 and 152 are moved upward and downward with respect to the cable bracket 142. Preferably, one pin 156 is pointing port and aft while the other pin 154 is pointing starboard and aft.

As shown in FIG. 7, the starboard outrigger 14 has right-handed flighting while the port outrigger 16 has left-handed flighting. FIG. 7 shows the vehicle 10 in the neutral position with the controller 98 of the joystick 92 positioned straight up and down and inserted into the small aperature 136 (FIG. 4). When the controller 98 of the joystick 92 is moved upward out of the aperature 136 and fore, the starboard inner cable 70 moves upward out of the outer sheath 74 (FIGS. 4 and 8). As the inner cable 70 moves upward, it pulls the transmission lever arm 68 into the forward position so that fluid is moved by the pump 56 downward through the forward drive hose 62 (FIGS. 4 and 5). The hydraulic motor 38 then turns the starboard outrigger 14. Similarly, when the controller 98 is moved fore, the port inner cable 152 moves upward thereby turning the port outrigger 16 in the forward direction so that the outriggers 14 and 16 rotate as shown in FIG. 8 causing the vehicle 10 to move forward.

As shown in FIG. 9, when the controller 98 of the joystick 92 is moved starboard from the position down in FIG. 8, the port cable 152 is moved even further upward while the starboard cable 70 is moved slightly downward. Although the starboard cable 70 is moved slightly downward, it is still upward of the neutral position (FIGS. 4 and 9). This orientation of the cables 70 and 152 causes a port transmission lever arm (not shown) to run the port hydraulic motor 78 at full forward speed while the starboard transmission arm 68 runs the starboard hydraulic motor 38 at only partial forward speed (FIG. 5). As the port outrigger 16 is given full forward speed and the starboard outrigger 14 is given only partial forward speed, the amphibious vehicle 10 moves in a broad forward and rightward turn (FIG. 9). Conversely, as shown in FIG. 10, when the controller 98 of the joystick 92 is moved fore and port, the port outrigger 16 is driven at partial forward speed while the starboard outrigger 14 is driven at full forward speed causing the vehicle 10 to move in a forward and leftward turn arc.

If it is desired to turn in a near zero radius, the controller 98 of the Joystick 92 may be moved either directly port or directly starboard from the neutral position. As shown in FIG. 11, when the joystick is moved starboard, the port cable 152 is extended while the starboard cable 70 is retracted (FIGS. 4 and 11). This orientation of the cables 70 and 152 causes the port transmission lever arm (not shown) to operate the port motor 76 in forward drive while the starboard transmission lever arm 68 operates the starboard motor 38 in reverse causing the vehicle 10 to make a substantially zero radius clockwise turn (FIG. 5). Conversely, when the controller 98 of the joystick 92 is moved directly port, the starboard cable 70 is fully extended while the port cable 152 is fully retracted causing the port motor 76 to be driven in reverse and the starboard motor 38 to be driven in forward drive (FIGS. 4, 5 and 12). As shown in FIG. 12, a port orientation of the controller 98 causes the vehicle 10 to rotate in a substantially zero radius counter-clockwise turn. When it is desired to move the vehicle 10 in reverse, the controller 98 of the joystick 92 is moved aft which brings both of the cables 70 and 52 downward (FIG. 13). The downward movement of the cables 70 and 152 causes both of the motors 38 and 76 to move in reverse (FIGS. 5 and 13).

Figure 15:
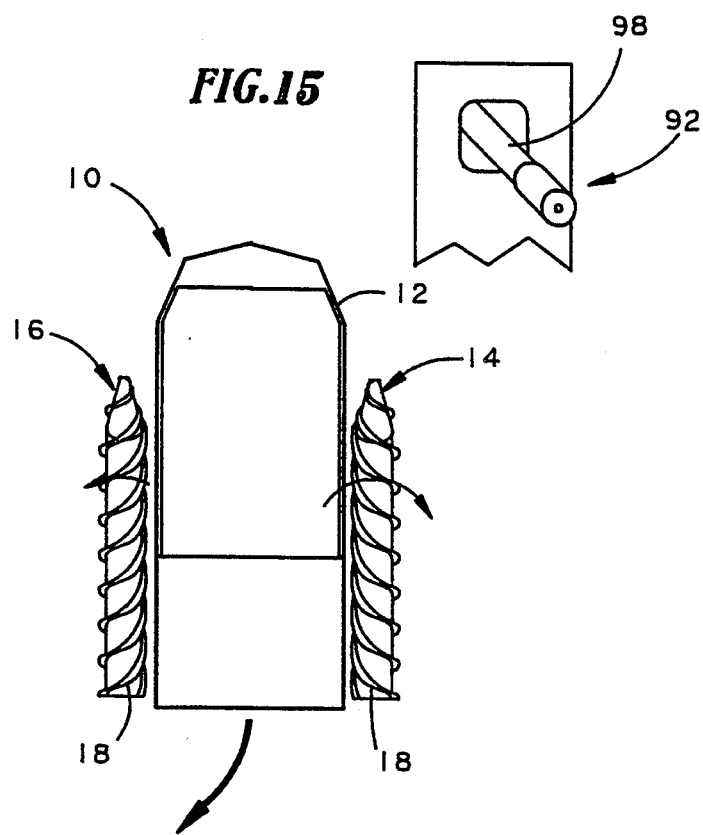
FIG. 15 is a top plan view showing the motion of the vehicle and the outriggers when the joystick is placed aft and starboard.

If it is desired to back and turn simultaneously, the controller 98 is moved aft and opposite the direction of the desired turn. For example, if it is desired to move the vehicle starboard and aft, the controller 98 is moved port and aft (FIG. 14). The starboard cable 70 is thereby pulled slightly upward from the reverse position while the port cable 152 is extended fully downward into the reverse position. Full reverse motion is delivered to the port outrigger 16 and partial reverse thrust is given to the starboard outrigger 14. Bringing the controller 98 aft and port consequently causes the vehicle 10 to turn starboard and aft. Similarly, when the controller 98 is moved aft and starboard, the vehicle 10 moves in a broad aft and port motion (FIG. 15).

Figure 16:
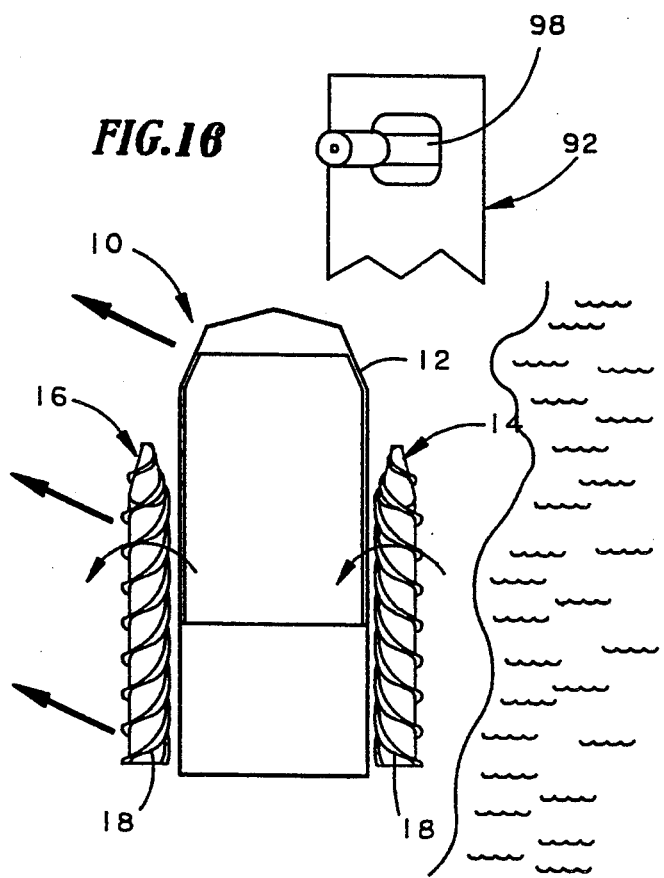
FIG. 16 is a top plan view showing the motion of the vehicle and the outriggers over land when the joystick is placed port.

When it is desired to move the vehicle 10 across land, the vehicle 10 is positioned close to the shore using the controller 98 and described above, and the controller 98 is moved in the direction of the shore (FIG. 16). Movement of the controller 98 toward the shore in FIG. 16 causes the port cable 152 to be retracted and the starboard cable 70 to be extended. While in the water, such a movement of the controller 98 would cause the vehicle 10 to move in a substantially zero radius counter-clockwise turn as shown in FIG. 12, such an orientation on land causes both outriggers 14 and 16 to traverse the land in the direction in which the outriggers 14 and 16 are moving. Similarly, the vehicle 10 may be moved back into the water by moving the controller 98 toward the water, thereby rotating the outriggers 14 and 16 in reverse and causing the vehicle 10 to move on the outriggers 14 and 16 toward the water. Once the vehicle 10 has entered the water, the controller 98 may be used to direct the vehicle 10 as described above to move in the desired direction.

The foregoing description and drawings merely explain and illustrate the invention. The invention is not limited thereto, except insofar as the claims are so limited, as those skilled in the art having the disclosure before them will be able to make modifications and variations therein without departing from the scope of the invention. By way of example, it should be clear that it is possible to shift the starboard outrigger 14 to the port starboard position and the port outrigger 16 to the starboard position and reverse the direction of the starboard and port hydraulic drive lines to decrease the movement of water over the hull 12 when the vehicle 10 is moving forward. Such an orientation of the outriggers 14 and 16, however, would necessitate the controller 98 to be moved opposite to the desired direction of movement when the vehicle 10 is on land.

What is claimed is:

1. A vehicle joystick for controlling a first vehicle control, a second vehicle control, and a third vehicle control simultaneously comprising:
    (a) a bracket support;
    (b) a bracket pivotally secured to said bracket support about a first axis;
    (c) a first ring pivotally secured to said bracket about a second axis perpendicular to said first axis;
    (d) a lever provided through said first ring in journaled relationship thereof;
    (e) a first pin extending from said first ring substantially perpendicular to said lever, said first pin being operably connected to the first vehicle control;
    (f) a second pin extending from said first ring substantially perpendicular to said lever, said second pin being operably connected to the second vehicle control;
    (g) a second ring operably secured around said lever; and
    (h) a third pin extending from said second ring substantially perpendicular to said lever, said third pin being operably connected to the third vehicle control.

2. The vehicle joystick of claim 1, wherein said first vehicle control is a first hydraulic motor and said second vehicle control is a second hydraulic motor.

3. The vehicle joystick of claim 1, further comprising an engine having a throttle wherein said throttle is operatively connected to said lever in such a manner that as said lever is rotated in a first direction said throttle is open and as said lever is rotated in a second direction said throttle is closed.

* * * * *